(12) United States Patent
Sohn et al.

(10) Patent No.: US 11,964,452 B2
(45) Date of Patent: Apr. 23, 2024

(54) INTERLAYER HAVING IMPROVED GRADIENT BAND

(71) Applicant: Solutia Inc., St. Louis, MO (US)

(72) Inventors: Sungkyun Sohn, Longmeadow, MA (US); Gary Matis, Wilbraham, MA (US); Jeffrey B. Hurlbut, West Springfield, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 17/757,115

(22) PCT Filed: Dec. 17, 2020

(86) PCT No.: PCT/US2020/065646
§ 371 (c)(1),
(2) Date: Jun. 9, 2022

(87) PCT Pub. No.: WO2021/127203
PCT Pub. Date: Jun. 24, 2021

(65) Prior Publication Data
US 2023/0008717 A1  Jan. 12, 2023

Related U.S. Application Data

(60) Provisional application No. 62/950,307, filed on Dec. 19, 2019.

(51) Int. Cl.
*B32B 17/10* (2006.01)
*B29C 48/17* (2019.01)
(Continued)

(52) U.S. Cl.
CPC ........ *B32B 17/10357* (2013.01); *B29C 48/17* (2019.02); *B29C 48/22* (2019.02);
(Continued)

(58) Field of Classification Search
CPC ........ B32B 17/10357; B32B 17/10036; B32B 17/10761; B32B 17/10935;
(Continued)

(56) References Cited

U.S. PATENT DOCUMENTS 2,282,026 A    5/1942  Bren et al.
2,282,057 A    5/1942  Hopkins et al.
(Continued)

FOREIGN PATENT DOCUMENTS

EP    0464790 A1    1/1992
EP    2921464 A1    9/2015

OTHER PUBLICATIONS

ASTM D1396, "Standard Test Methods for Chemical Analysis of Poly(Vinyl Butyral)"; Reapproved 1998.
(Continued)

*Primary Examiner* — Betelhem Shewareged
(74) *Attorney, Agent, or Firm* — Steven A. Owen

(57) ABSTRACT

Polymer interlayers having improved gradient bands and laminates comprising these interlayers are disclosed. The polymer interlayers and laminates comprising polymer interlayers have a gradient band that has a high level of gradient beauty from the perspective of visible light transmittance spectra.

20 Claims, 8 Drawing Sheets

(51) Int. Cl.
*B29C 48/22* (2019.01)
*B29L 7/00* (2006.01)

(52) U.S. Cl.
CPC .. *B32B 17/10036* (2013.01); *B32B 17/10761* (2013.01); *B32B 17/10935* (2013.01); *B29L 2007/002* (2013.01); *B32B 2605/006* (2013.01)

(58) Field of Classification Search
CPC ... B32B 2605/006; B29C 48/17; B29C 48/22; B29L 2007/002
USPC ......................................................... 428/203
See application file for complete search history.

(56) References Cited

U.S. PATENT DOCUMENTS

| | | | |
|---|---|---|---|
| 3,405,425 A | 10/1968 | Buckley et al. | |
| 3,715,420 A | 2/1973 | Kiyono et al. | |
| 3,799,718 A | 3/1974 | Kiyono et al. | |
| 4,316,868 A | 2/1982 | Esposito et al. | |
| 5,137,954 A | 8/1992 | DasGupta et al. | |
| 5,154,870 A | 10/1992 | Urui et al. | |
| 8,945,446 B2 | 2/2015 | Ogino et al. | |
| 2008/0102280 A1* | 5/2008 | Lu | B32B 27/30 428/524 |
| 2010/0068532 A1* | 3/2010 | Fisher | B32B 17/10688 428/426 |
| 2023/0008717 A1* | 1/2023 | Sohn | B32B 17/10761 |

OTHER PUBLICATIONS

ASTM D1003, "Standard Test Method for Haze and Luminous Transmittance of Transparent Plastics"; Jun. 2021.
Notification of Transmittal of the International Search Report and the Written Opinion of the International Searching Authority, or the Declaration dated Apr. 12, 2021 received in International Application No. PCT/US2020/065646.
Wade, B.; "Vinyl Acetal Polymers"; Encyclopedia of Polymer Science and Technology; 2016 22 pgs. (online).

* cited by examiner

INTERLAYER HAVING IMPROVED GRADIENT BAND

CROSS-REFERENCE TO RELATED APPLICATION(S)

This application is a national stage filing under 35 USC § 371 of International Application Number PCT/US2020/065646, filed on Dec. 17, 2020 which claims the benefit of the filing date to U. S. Provisional Application Number 62/950307, filed on Dec. 19, 2019, the entire disclosures of which are incorporated by reference herein.

BACKGROUND

1. Field of the Invention

The present invention generally relates to polymer interlayers having improved gradient bands and laminates comprising these interlayers. More particularly, the present invention generally relates to polymer interlayers and laminates comprising polymer interlayers having a gradient band that has a high level of gradient beauty from the perspective of visible light transmittance spectra.

2. Description of the Related Art

Generally, multiple layer glass panels comprise a laminate comprised of an interlayer or multilayer interlayer or interlayers sandwiched between two panes of glass. In some applications, a laminate may comprise only one pane of glass or other rigid substrate. The laminated multiple layer glass panels are commonly utilized in transportation vehicles (including automobiles, trucks, trains, boats, airplanes) and other application. Multiple layer glass panels used in transportation applications are commonly referred to as laminated safety glass. Typically, the main function of the interlayer in the laminated safety glass is to absorb energy resulting from impact or force applied to the glass, keep the layers of glass bonded even when the force is applied, and if the glass is broken, prevent the glass from breaking away into sharp loose pieces. In addition to these safety benefits, interlayers can additionally give the laminated glass a higher sound insulation rating, reduce UV and IR transmission, provide a gradient or shade band, and/or enhance the aesthetic appeal of the associated window.

Typically, interlayers intended for use in laminated glass applications are generally produced by mixing a polymer resin, such as poly(vinyl acetal), with one or more plasticizers and melt processing the mix into an interlayer by any applicable process or method known to one of skill in the art. After being formed, these interlayers, or multilayer interlayers, are typically wound onto rolls for storage prior to later use in multiple layer glass panels.

Interlayers can be incorporated into multiple layer glass panels using various techniques known in the art. For example, at least one interlayer can be placed between two substrates and any excess interlayer can be trimmed from the edges, thereby creating an assembly. It is not uncommon for multiple interlayers to be placed within or between the two substrates thereby creating a multiple layer stack with exterior glass panels and multiple internal polymeric interlayers. Once formed, these stacks are typically processed to remove the majority of interfacial air by an applicable process or method known to one of skill in the art, such as through nip rollers, vacuum bag, vacuum ring, or another suitable de-airing mechanism. Additionally, the interlayer can be partially press bonded to the substrates by any method known to one of ordinary skill in the art. In a last step, the interfacial bonding generated during the deairing operation is typically rendered more permanent by a high temperature and/or pressure lamination process, some of which are known to one of ordinary skill in the art such as, but not limited to, autoclaving.

A popular option in an automobile is a windshield or windscreen in which the upper region has a colored gradient (or shade) band so as to reduce the intensity of the sunlight shining through that portion of the windshield and on to the driver and front seat passengers. This colored gradient band shades gradually down to the dominant hue of the rest of the windshield.

An interlayer containing a gradient band can be produced in several different ways. U.S. Pat. No. 4,316,868 discloses a process and apparatus for producing a colored gradient band in an extruded thermoplastic sheet. In the process, a probe is inserted in a sheet extrusion die manifold and a colored melt is injected into the polymer melt such that a sheet with a color band is obtained. U.S. Pat. No. 8,945,446 discloses a process where the gradient or colored layer is extruded by a secondary extruder. In the process, the molten colored resin composition forms the inserted layer which is surrounded by outer layers through a flow path separately set inside the extrusion die. Alternatively, a colored band on a thermoplastic sheet material can be obtained by applying an ink material to the sheet surface under appropriately controlled conditions. Techniques that have been used include printing, dipping, and spraying using a wide variety of apparatus. In addition, coextrusion of colored plastic with a transparent plastic can be used to produce gradient interlayers.

Current techniques for making an interlayer having a gradient band typically involve coextrusion of a colored polymer with a transparent polymer. Some coextrusion techniques are difficult to control in practice, particularly where a gradient color band such as is desired for use in interlayers for automobile windshields is the goal. It is a characteristic requirement for such interlayers that the quality be extremely even with no color variations apart from the gradual diminution of optical density towards the cut-off area. Moreover the location of the cut-off must be the same right across the sheet. Thus variations in polymer melt flow through the extrusion device must be avoided. This gives rise to formidable control problems.

It is a characteristic requirement for such interlayers that the quality be extremely even with no color variations apart from the gradual diminution of optical density towards the cut-off area, which also determines visual beauty. Gradient bands can have different appearance and visual beauty based on how their visible light transmittance spectra are shaped. Additionally, an optical illusion known as "Mach band" appears on the clear side of the cut-off. Severity of the Mach band in terms of sharpness and/or width can be visually unappealing.

Through available technologies mentioned above, a target transmittance spectrum for interlayers can be easily designed reflecting the desired shape of the spectrum, and conveniently produced. Attempts to change the shape of visible light transmittance spectrum, especially on the fade-off area between the dark plateau and the cut-off, have been made but with limited success. For instance, controlling fade-off distance, either shorter or longer than the normal, diffusing colorants into adjacent clear layer(s), taking advantage of diffusion phenomenon, are commonly used means to improve gradient beauty. None of these methods produce an interlayer having a gradient band that has a high level of gradient beauty from the perspective of visible light transmittance spectra on the laminated glass containing such an interlayer.

Accordingly, there is a need for an interlayer having an improved gradient band and a process for making the interlayer that is relatively easy to control, is capable of giving a uniform gradient band.

SUMMARY OF THE INVENTION

The present invention generally relates to interlayers having gradient bands that exhibit superior properties and that provide desirable optical properties when incorporated into laminates, such as windshields. The present invention generally relates to polymer interlayers and laminates comprising polymer interlayers having a gradient band that has a high level of gradient beauty from the perspective of visible light transmittance spectra.

In an embodiment, an interlayer having improved gradient quality, comprises: a first layer having a clear portion and a gradient color band portion, and wherein the gradient color band portion is encapsulated within the clear portion, wherein the gradient color band portion has a cut-off X at the start of the gradient color band, a point Y where the % transmittance of the gradient color band is 40%, a point Z where the % transmittance of the gradient color band is 70%, a distance D that is the distance from X to Y and a distance d that is the distance from Y to Z, and wherein the distance D in the gradient portion meets the following equations: 22.9 mm<D<38.1 mm and D/d<2.00.

In an embodiment, a process for making an interlayer having improved gradient quality comprises the steps of: (a) providing a sheet extrusion die having an orifice and a manifold adapted to feed a polymer melt to the orifice by way of an extrusion passage; (b) providing a probe located within the manifold and adjacent the extrusion passage wherein the probe has in the surface adjacent the extrusion passage an extrusion orifice that extends parallel to the probe axis and wherein the probe is located in such a position that, when a main flow of a thermoplastic polymer is fed into the manifold and extruded through the slit die by way of the extrusion passage, the stream lines of the main flow as it passes by the probe orifice are substantially parallel and in the direction of extrusion; (c) feeding a main flow of molten thermoplastic polymer to the manifold and a colored secondary flow of the molten thermoplastic polymer, at substantially the same temperature and viscosity, to the probe; (d) extruding both flows simultaneously such that a layer of colored polymer that is constant in width but tapering in thickness at one extremity of its width, is completely encapsulated in the main flow of molten polymer; and (e) extruding the combined flows through the slit die to produce a sheet with an encapsulated gradient color band portion, wherein the gradient color band portion has a cut-off X at the start of the gradient color band, a point Y where the % transmittance of the gradient color band is 40%, a point Z where the % transmittance of the gradient color band is 70%, a distance D that is the distance from X to Y and a distance d that is the distance from Y to Z, and wherein the distance D in the gradient portion meets the following equations: 22.9 mm<D<38.1 mm and D/d<2.00.

In another embodiment, the present invention includes an interlayer produced by the process previously described.

In another embodiment, a windshield comprises a first glass substrate, an interlayer as previously described, and a second glass substrate.

BRIEF DESCRIPTION OF THE FIGURES

Embodiments of the present invention are described herein with reference to the following drawing figures, wherein.

DETAILED DESCRIPTION

The present invention generally relates to interlayers having improved gradient bands and that provide desirable optical properties when incorporated into laminates, such as windshields. The interlayers improved optical quality. More particularly, the present invention generally relates to polymer interlayers having a color or gradient band having improved gradient beauty and good Mach band qualities.

It has been discovered that interlayers having gradient bands can be successfully produced when certain parameters for making the gradient band are used, as further described below. Specifically, the present invention discloses what it takes to achieve a high level of gradient beauty from the perspective of visible light transmittance spectra on the laminated glass containing such an interlayer.

Figure 1:
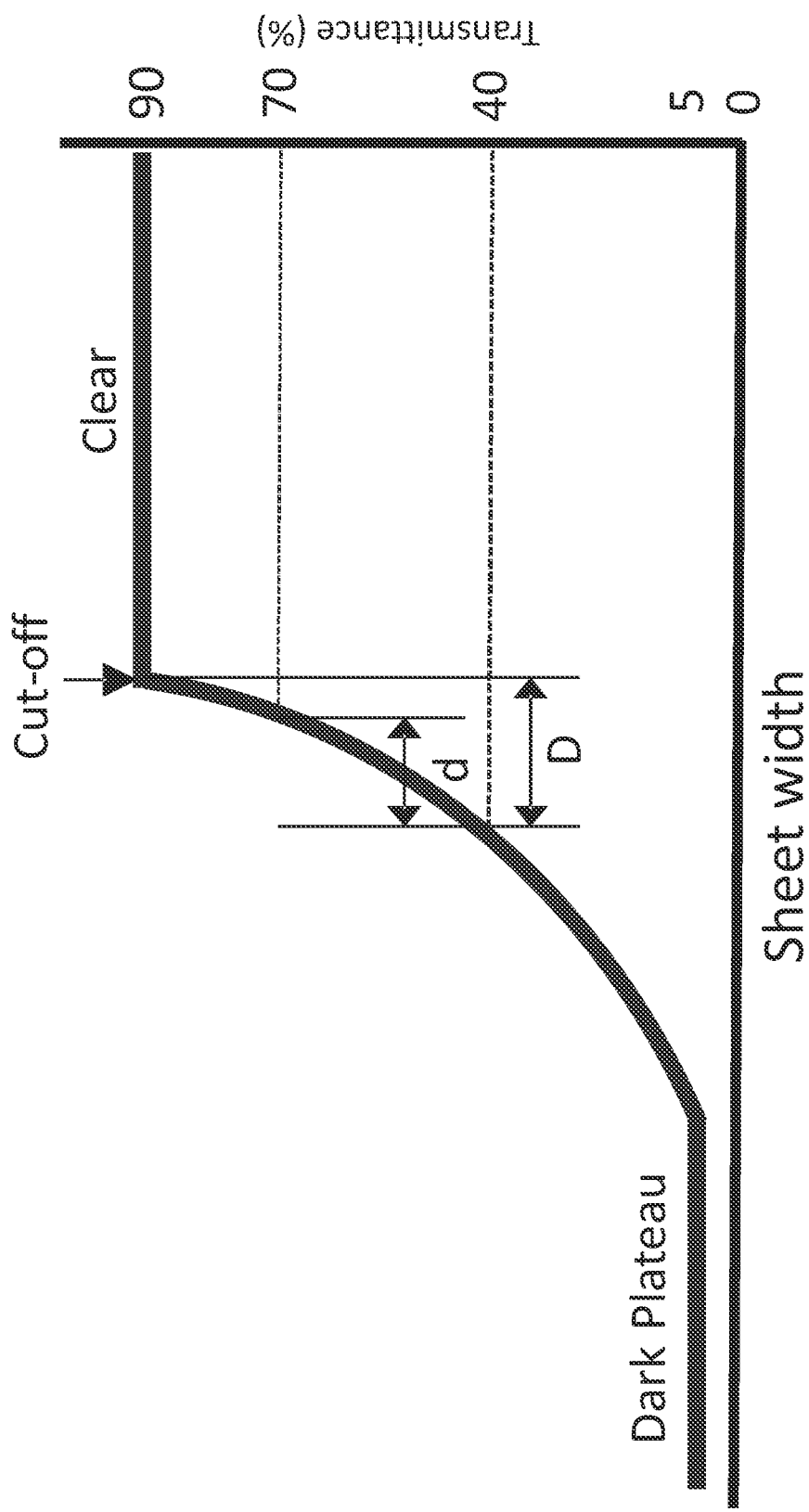
FIG. 1 depicts a simplified illustration of what a transmittance spectrum of a laminated glass containing a gradient band.

FIG. 1 depicts a simplified illustration of what a transmittance spectrum of a laminated glass containing a gradient band would look like. Referring to FIG. 1, the cut-off is the start of the gradient band and the point at which the thickness of the colored layer goes to zero. The cut-off can be referred to as point X. The dark plateau is the region where transmittance reaches its lowest level. In FIG. 1, D is the distance from the cut-off to the point where the transmittance reaches 40% (which can be referred to as point Y), and d is the distance from the point where the transmittance reaches 70% (which can be referred to as point Z) to the point where it reaches 40%. Both D and d are defined as means to describe the fade-off distance between the dark plateau and the cut-off. Using points X, Y and Z to define the distances D and d, the distance D is equal to the distance from X to Y, and the distance d is equal to the distance from Y to Z.

Based on multiple experiments with gradient interlayers and analyses of the transmittance spectra, the inventors of the present invention have determined that for the gradient band whose width is about 10 to 102 centimeters (cm) (about 4 to 40 inches), the gradient beauty is optimized if the following conditions are met, regardless of how the gradient band is produced and whether the sheet containing the gradient band is monolithic or multiple layers. To produce a gradient band having improved gradient beauty, the conditions that need to be met are: 1) 22.9 mm<D<38.1 mm (0.90 in<D <1.5 in); 2) D/d<2.00; and 3) color is only present and visible in 1 layer, and there is no visible diffusion of color into adjacent layer(s).

If D is less than about 22.9 mm, the transition from the dark plateau to the cut-off becomes stiff, decreasing the visual quality of the gradient band and is oftentimes accompanied by a sharper and/or brighter Mach band on the clear side of the cut-off. As used herein, a Mach band is defined as a visual "defect" that is an optical illusion due to the spatial high-boost filtering performed by the human visual system on the luminance channel of the image captured by the retina. It exaggerates the contrast between edges of slightly differing shades of certain color, such as blue, as soon as they are adjacent to one another, by triggering edge-detection in the human visual system. The presence of a Mach band that is sharper or brighter is objectionable to consumers. If D is greater than about 38.1 mm, transition from the dark plateau to the cut-off becomes too broad, which also adversely affects the quality, and specifically the beauty, of the gradient band. In embodiments, it is more desirable if 23.2 mm<D<37.5 mm, or 23.4 mm<D<37.0 mm, or 23.6 mm <D<36.5 mm, or 23.8 mm<D<36.0 mm, or 24.0 mm<D<36.5 mm, or 24.2 mm<D<36.0 mm, or 24.4 mm<D<35.5 mm, or 24.5 mm<D<35.0 mm, or 24.6 mm<D<34.5 mm, or 24.7 mm<D<34.0 mm, or 24.8 mm<D<33.5 mm, or 24.9 mm<D<33.0 mm, or 25.0 mm<D<32.5 mm, or 25.1 mm<D<32.0 mm, or 25.2 mm<D<31.5 mm, or 25.3 mm<D<31.0 mm, or 25.4 mm<D<30.5 mm (1.0 in<D<1.2 in). In embodiments, D greater than 22.9, or greater than 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3 or greater than 25.4. In embodiments, D is less than 38.1, less than 38.0, 37.9, 37.8, 37.7, 37.6, 37.5, 37.4, 37.3, 37.2, 37.1, 37.0, 36.9, 36.8, 36.7, 36.6, 36.5, 36.4, 36.3, 36.2, 36.1, 36.0, 35.9, 35.8, 35.7, 35.6, 35.5, 35.4, 35.3, 35.2, 35.1, 35.0, 34.9, 34.8, 34.7, 34.6, 34.5, 34.4, 34.3, 34.2, 34.1, 34.0, 33.9, 33.8, 33.7, 33.6, 33.5, 33.4, 33.3, 33.2, 33.1, 33.0, 33.9, 32.8, 32.7, 32.6, 32.5, 32.4, 32.3, 32.2, 32.1, 32.0, 31.9, 31.8, 31.7, 31.6, 31.5, 31.4, 31.3, 31.2, 31.1, 31.0, 30.9, 30.8, 30.7, 30.6 or less than 30.5.

Another factor that is important to gradient quality is the ratio of D/d. In embodiments, the ratio of D/d is less than 2.00, or less than 1.99, or less than 1.98, or less than 1.97, or less than 1.96 or less than 1.95. When D/d is greater than 2.00, overall gradient beauty degrades and the transmission spectrum reaching cut-off may become sharp. Additionally, the severity of the Mach band on the clear side of the cut-off is greater and the Mach band quality worsens. In embodiments, D/d is at least 1.50, or at least 1.60, or at least 1.70, or at least 1.80 or more. In embodiments, it is even more desirable if D/d is between 1.80 and 1.99.

It is important that the colorants that are used to form the gradient band in the interlayer must remain in a single unique layer, while not visibly diffusing into the adjacent "clear" layer or layers. Here, the "layer" includes the clear layer encapsulating the gradient band if gradient was enabled by a use of a probe such as one disclosed in U.S. Pat. No. 4,316,868. Such colorant diffusion to adjacent layer(s) makes it more difficult to maintain uniformity of the gradient band in the sheet extrusion (or machine) direction, and may cause quality problems such as mottle within the gradient band.

In general, the process used to produce an interlayer having a gradient band is as follows: (a) providing a sheet extrusion die having a slit die orifice and a manifold adapted to feed a polymer melt to said orifice by way of an extrusion passage; (b) providing a generally torpedo-shaped probe located eccentrically within the manifold and adjacent the extrusion passage with the axis of the probe parallel to the slit die orifice, said probe having in the surface adjacent the extrusion passage, a wedge-shaped extrusion orifice that extends parallel to the probe axis for less than half of the width of the extrusion passage and being located in such a position that, when a thermoplastic polymer is fed into the manifold and extruded through the slit die by way of the extrusion passage, the stream lines of the polymer flow as it passes by the wedge-shaped orifice in the probe are substantially parallel and in the direction of extrusion; (c) feeding a main flow of molten thermoplastic polymer to the manifold and a colored secondary flow of the same polymer at substantially the same temperature and viscosity to the probe; (d) extruding both flows simultaneously such that a layer of colored polymer that is constant in width is completely encapsulated in the main flow of molten polymer fed to the extrusion manifold; and (e) extruding the combined flows through the slit die to produce a sheet with a gradient color band.

The probe configuration is designed such that the stream lines of the main polymer flow as it passes the extrusion orifice in the probe remain substantially parallel and in the direction of extrusion. The critical part of the probe is the portion containing the wedge shaped extrusion orifice since non parallel stream lines at that point will tend to distort the shape of the colored extrudate band. It is desirable then that the probe be shaped so as to get the orifice as close as possible to the extrusion passage without forming a choke at that point. A probe configuration that provides the specific dark plateau and cut-off such that D and D/d are as previously disclosed is particularly preferred. By having a probe that provides the required dark plateau and cut-off, an interlayer having improved gradient beauty can be produced.

The orifice in the probe may be wedge-shaped but this is not intended to imply that the orifice necessarily has a triangular configuration. In a preferred configuration the thickness of the orifice is constant over much of its width before tapering at one end. The tapering can be in straight-line fashion but more frequently the taper is shaped to give a color fade-off, when the gradient band is observed in the finished sheet, that is more aesthetically pleasing and meets the criteria previously described. The orifice generally has a width that is less than the length of the probe. Often the orifice extends for from 30 to 50% of the total length of the probe inside the manifold and produces a color band that is less than half the width of the extruded sheet and preferably from 5 to 30% of that width. The probe is located at a point in the manifold at which the stream-lines of the main flow as it passes the wedge-shaped extrusion orifice in the probe are substantially parallel and in the direction of extrusion.

When a main flow is fed through a feed pipe into a manifold communicating with a slit die orifice by means of an extrusion passage the stream lines are initially divergent from the feed pipe as the polymer spreads to fill the manifold. However a conventional slit die extrusion device is so designed that, as the polymer to be extruded flows through the extrusion passage, it flows at substantially the same rate across its full width, that is, so that the flow lines of the polymer in the extrusion passage are substantially parallel and in the direction of extrusion. Parallel flow is then reached close to the entry of the extrusion passage proper and as indicated above this is the preferred location of the probe orifice.

In practice the probe can extend up to 75% or preferably up to 25% of the width of the extrusion passage. Since the preferred configuration places the narrowest point of the wedge-shaped orifice adjacent the probe tip this will result in a polymer sheet with a color band with its greatest density adjacent the edge of the sheet and fading off towards the middle of the sheet when viewed from above. Such a sheet is ideally configured for the production of car windshield interlayers.

The temperature and viscosity of the colored melt extruded through the probe are substantially the same as those of the main flow fed to the manifold. It is however intended that this term should embrace variations of temperature and viscosity between the two streams of up to 10% since no significant adverse effects result therefrom.

The velocity of the two streams at the point of first contact may however differ significantly if desired. It is found that if the colored secondary melt flow is extruded at a faster velocity a thicker band is obtained than if the velocities are matched. Thicker bands are often advantageous since it permits a lower color-density melt to be used to achieve the same color density in the resulting sheet. A preferred feature of the present invention therefore is to extrude the colored secondary melt flow at a velocity that is up to twelve times and preferably from 5 to 10 times greater than that of the main polymer melt flow as it first contacts the colored melt. The resulting gradient band, at its thickest point can represent from 15 to 95% of the total thickness of the sheet and preferably from 60 to 90% of the thickness.

The main flow fed into the manifold can also be colored though it would defeat an important purpose of the invention if both the main flow and the colored secondary flow were colored to the same density. It is therefore preferred that the main flow be clear or of a substantially lower color density than that fed to the probe.

As used herein, the term "interlayer" refers to a single or multiple layer polymer sheet that may be suitable for use with at least one rigid substrate to form a multiple layer panel. The terms "single-sheet" and "monolithic" interlayer refer to interlayers formed of one single sheet, while the terms "multiple layer" and "multilayer" interlayer refer to interlayers having two or more sheets that are coextruded, assembled, laminated, or otherwise coupled to one another.

The term "multilayer interlayer" refers to polymer interlayers comprising at least two polymer layers. As discussed further below, the multiple layers may be separately extruded layers, co-extruded layers, or any combination of separately and co-extruded layers. Thus, the multilayered interlayer could comprise, for example, two or more single-layer interlayers combined together ("plural-layer interlayer"); two or more layers co-extruded together ("co-extruded interlayer"); two or more co-extruded interlayers combined together; a combination of at least one single-layer interlayer and at least one co-extruded interlayer; and a combination of at least one plural-layer interlayer and at least one co-extruded interlayer.

As noted above, the polymer layers or interlayers can be used to form multilayer interlayers and laminates such as windscreens or other laminated glass panels useful in many applications. In various embodiments, these polymer layers can be formed from a thermoplastic resin such as ethylene vinyl acetate, thermoplastic polyurethane, ionomer, poly (vinyl acetal), and mixtures thereof, although interlayers comprising poly(vinyl acetal) will be described herein.

Generally, the polymer layers can comprise at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of one or more thermoplastic resins based on the total weight of the polymer layer. Additionally or alternatively, the polymer layers can comprise not more than 99, not more than 95, not more than 90, not more than 80, not more than 70, not more than 60, or not more than 50 weight percent of one or more thermoplastic resins based on the total weight of the polymer layer, although other amounts may be used as desired.

In various embodiments, the layers or interlayers described herein may comprise at least two polymer layers (e.g., a single layer or multiple layers co-extruded) disposed in direct contact with each other. When three or more layers are employed in the multilayered interlayers, some of the layers can be referred to as skin layers and one or more may be referred to as core layers. As used herein, "skin layer" generally refers to outer layers of the interlayer and "one or more core layers" generally refers to one or more of the inner layer(s) disposed between the skin layers. At least one side of a core layer can be in direct contact with at least one side of a skin layer or may be in indirect contact with a skin layer through a tie layer, a coating or adhesive agent.

Exemplary layer configurations in multilayer interlayer embodiments include: skin/core/skin, skin/core, skin/core/core/skin, and skin/core/core/core/skin, as well as other embodiments are possible, as would be known to one skilled in the art.

Multilayer interlayers described herein can also have more than three layers (e.g., at least 4, at least 5, at least 6, or up to 10 or more individual layers). In various embodiments, the multilayer interlayer structures can contain 2, 3, 4, or more polymer layers and 2 or more of them can be in direct contact with each other, or with other types of layers. The layers can have varying thicknesses, which are largely determined by the type of interlayer or laminate that the layer is being used in and can be any of the thicknesses desired.

In various embodiments, the thickness, or gauge, of any of the layers or interlayers can be at least about 0.5, at least about 1, at least about 2, at least about 3, at least about 4, at least about 5, at least about 6, at least about 7, at least about 8, at least about 9, at least about 10, at least about 15, at least about 20, at least about 25, at least about 30, at least about 35, at least about 40, at least about 45, at least about 50, at least about 55, at least about 60 mils or more, depending on the desired properties and application. In millimeters, the thickness of the polymer layers or interlayers can be at least about 0.025, at least about 0.05, at least about 0.075, at least about 0.10, at least about 0.125, at least about 0.150, at least about 0.175, at least about 0.20, at least about 0.225, at least about 0.25, at least about 0.38, at least about 0.51, at least about 0.64, at least about 0.76, at least about 0.89, at least about 1.02, at least about 1.15, at least about 1.28, at least about 1.52 mils or more.

The polymer layers described herein can further include at least one plasticizer. Depending on the specific composition of the thermoplastic resin(s) forming the polymer layers, the plasticizer may be present in an amount of at least 1, at least 2, at least 3, at least 4, at least 5, at least 10, at least 15, at least 20, at least 25, at least 30, at least 35, at least 40, at least 45, at least 50, at least 55, at least 60 phr or more. In embodiments, the amount of plasticizer may be not more than 120, not more than 110, not more than 105, not more than 100, not more than 95, not more than 90, not more than 85, not more than 75, not more than 70, not more than 65, not more than 60, not more than 55, not more than 50, not more than 45, or not more than 40 phr, although other amounts may be used depending on the specific materials and desired properties.

In various embodiments, the interlayer can contain at least 2, at least 5, at least 8, at least 10, at least 13, at least 15, at least 18, or at least 20 weight percent or more of at least one plasticizer based on the weight of the polymer layer. Additionally or alternatively, the polymers can contain up to 100, up to 80, up to 70, up to 60, up to 50, up to 40, up to 30, up to 25, or up 20 weight percent of at least one plasticizer based on the weight of the polymer layer.

If a plasticizer is used, the plasticizer(s) can be any that is known in the art. The plasticizer can be either monomeric or polymeric in structure. In various embodiments, the plasticizer can be a compound having a hydrocarbon segment of 30 or less, 25 or less, 20 or less, 15 or less, 12 or less, or 10 or less carbon atoms and at least 6 carbon atoms. Suitable conventional plasticizers for use in these interlayers include, for example, esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. In certain embodiments, the plasticizer is 3GEH.

Additionally, other plasticizers, such as high refractive index plasticizers, may also be used, either alone or in combination with another plasticizer. As used herein, the term "high refractive index plasticizer," refers to a plasticizer having a refractive index of at least 1.460. The high refractive index plasticizers may increase or reduce the refractive index of one or more of the layers, which may improve the optical properties of the interlayer, including mottle, haze, and/or clarity. In embodiments, the high RI plasticizers suitable for use can have a refractive index of at least 1.460, at least 1.470, at least 1.480, at least 1.490, at least 1.500, at least 1.510, at least 1.520 and/or not more than 1.600, not more than 1.575, or not more than 1.550, measured as discussed above.

When the resin layer or interlayer includes a high RI plasticizer, the plasticizer can be present in the layer alone or it can be blended with one or more additional plasticizers. Examples of types or classes of high refractive index plasticizers can include, but are not limited to, polyadipates (RI of 1.460 to 1.485); epoxides such as epoxidized soybean oils (RI of 1.460 to 1.480);

phthalates and terephthalates (RI of 1.480 to 1.540); benzoates and toluates (RI of 1.480 to 1.550); and other specialty plasticizers (RI of 1.490 to 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), di-(butoxyethyl) terephthalate, di-(butoxyethyoxyethyl) terephthalate, and mixtures thereof. In embodiments, the high RI plasticizer may be selected from dipropylene glycol dibenzoate and tripropylene glycol dibenzoate, and/or 2,2,4-trimethyl-1,3-pentanediol dibenzoate. In various embodiments, the plasticizer can be selected from at least one of the following: benzoates, phthalates, phosphates, arylene-bis (diarylphosphate), and isophthalates.

Other useful plasticizers include triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate Mixtures of plasticizers can also be used. For example, a mixture of a high refractive index plasticizer and a conventional plasticizer may be used. Alternatively, two or more conventional and/or high refractive index plasticizers may be used alone or with other plasticizers.

In various embodiments, the polymer layer described herein can comprise, consist essentially of, or consist of a poly(vinyl acetal) resin, such as polyvinyl butyral. The poly(vinyl acetal) layers can be used in conjunction with the other polymer layers described herein to produce various types of multilayer interlayers.

The poly(vinyl acetal) resin can be produced formed by acetalization of poly(vinyl alcohol) with one or more aldehydes in the presence of a catalyst according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.).

Poly(vinyl acetal) resins typically have a residual hydroxyl content, an ester content, and an acetal content. As used herein, residual hydroxyl content (calculated as PVOH) refers to the weight percent of moieties having a hydroxyl group remaining on the polymer chains. For example, poly (vinyl acetal) can be manufactured by hydrolyzing poly (vinyl acetate) to PVOH, and then reacting the PVOH with an aldehyde, such as butyraldehyde, propionaldehyde, and the like, and desirably butyraldehyde, to make a polymer having repeating vinyl butyral units. In the process of hydrolyzing the poly(vinyl acetate), typically not all of the acetate side groups are converted to hydroxyl groups. For example, reaction with butyraldehyde typically will not result in the conversion of all hydroxyl groups on the PVOH to acetal groups. Consequently, in any finished polyvinyl butyral, there typically will be residual ester groups such as acetate groups (as vinyl acetate groups) and residual hydroxyl groups (as vinyl hydroxyl groups) as side groups on the polymer chain and acetal (e.g., butyral) groups (as vinyl acetal groups). As used herein, residual hydroxyl content is measured on a weight percent basis per ASTM 1396.

In various embodiments, the poly(vinyl acetal) resin comprises a polyvinyl butyral resin, which is also interchangeably referenced herein as "PVB." An example of a polyvinyl butyral structure is used to further illustrate how the weight percentages are based from the moiety unit to which is bonded the relevant pendant group:

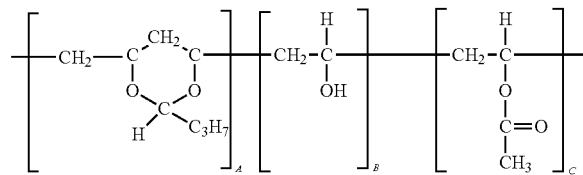

Taking the above structure of polyvinyl butyral, the butyral or acetal content is based on the weight percentage of unit A in the polymer, the OH content is based on the weight percentage of unit B in the polymer (a polyvinyl OH moiety or PVOH), and the acetate or ester content is based on the weight percentage of unit C in the polymer.

The hydroxyl group content of the poly(vinyl acetal) resin is not particularly limited, but suitable amounts are from at least 6, at least 8, at least 10, at least 11, at least 12, at least 13, at least 14, at least 15, at least 16, or at least 17 and in each case up to 35 weight percent or more of PVOH. In some embodiments, the poly(vinyl acetal) may have less than 15 weight percent, or less than 14, less than 13, less than 12, less than 11, less than 10, less than 9, or less than 8 weight percent residual hydroxyl content. In general, a poly(vinyl acetal) resin having a lower hydroxyl weight percentage has the capability of absorbing more plasticizer and absorbing it more efficiently.

The poly(vinyl acetal) resin can also comprise 20 weight percent or less, 17 weight percent or less, 15 weight percent or less, 13 weight percent or less, 11 weight percent or less, 9 weight percent or less, 7 weight percent or less, 5 weight percent or less, or 4 weight percent or less of residual ester groups calculated as polyvinyl ester, for example, acetate, with the balance being an acetal, such as butyraldehyde acetal, but optionally including other acetal groups in a minor amount, for example, a 2-ethyl hexanal group (see U.S. Pat. No. 5,137,954). As with the residual hydroxyl group measurement, the weight percent of residual ester groups (that is, residual acetate content) is based on the moiety in the polymer backbone onto which is linked the acetate group, including the pendant acetate group.

The poly(vinyl acetal) resin used in the invention can also have an acetal content of at least 50, at least 55, at least 60, at least 65, at least 70, at least 75, at least 80, at least 85, or at least 90 weight percent or more.

Additionally or alternatively, the acetal content can be up to 94, up to 93, up to 92, up to 91, up to 90, up to 89, up to 88, up to 86, up to 85, up to 84, up to 83, up to 82, up to 80, up to 78, up to 77, up to 75, up to 70, or up to 65 weight percent.

The acetal groups in the poly(vinyl acetal) resins can comprise vinyl propynyl groups or vinyl butyral groups. In one or more embodiments, the acetal groups comprise vinyl butyral groups. In some embodiments, the poly(vinyl acetal) resin can include residues of any aldehyde and, in some embodiments, may include residues of at least one $C_4$ to $C_8$ aldehyde. Examples of suitable $C_4$ to $C_8$ aldehydes can include, for example, n-butyraldehyde, i-butyraldehyde, 2-methylvaleraldehyde, n-hexyl aldehyde, 2-ethylhexyl aldehyde, n-octyl aldehyde, and combinations thereof. One or more of the poly(vinyl acetal) resins utilized in the layers and interlayers described herein can include at least 20, at least 30, at least 40, at least 50, at least 60, or at least 70 weight percent or more of residues of at least one $C_4$ to $C_8$ aldehyde, based on the total weight of aldehyde residues of the resin. Alternatively, or in addition, the poly(vinyl acetal) resin may include not more than 99, not more than 90, not more than 85, not more than 80, not more than 75, not more than 70, or not more than 65 weight percent of at least one $C_4$ to $C_8$ aldehyde. The $C_4$ to $C_8$ aldehyde may be selected from the group listed above, or it can be selected from the group consisting of n-butyraldehyde, i-butyraldehyde, 2-ethylhexyl aldehyde, and combinations thereof.

The weight average molecular weight of the poly(vinyl acetal) resin is not particularly limited. The poly(vinyl acetal) resin can have a weight average molecular weight (Mw) of at least 20,000, at least 30,000, at least 40,000, at least 50,000, at least 60,000, or at least 70,000, with no particular upper limit. Practically up to 300,000 Daltons is generally suitable, although higher molecular weights maybe be used in some cases, and in each case as measured by size exclusion chromatography using the low angle laser light scattering (SEC/LALLS) method of Cotts and Ouano in tetra-hydrofuran as described below.

Multilayer interlayers containing multiple layers such as one or more poly(vinyl acetal) layers can be produced using any method known in the art. For example, each layer may be formed separately using techniques known in the art and then laminated together. Alternatively, multilayer interlayers may be produced via co-extrusion.

In various embodiments, the interlayer may be an acoustic interlayer. Often, polymers that exhibit one set of desirable properties, such as acoustic performance, lack other desirable properties, such as impact resistance or strength. Therefore, in order to achieve desirable combinations of properties, multilayered interlayers can be produced containing a poly(vinyl acetal) layer exhibiting desirable acoustic performance and one or more other polymer layers providing impact strength and resistance. In one or more embodiments, the acoustic interlayers can contain a poly(vinyl acetal) layer having a Tg of at least -30, at least -25, at least -20, at least -15, at least -10, at least -5, or at least 0° C. and/or less than 40, less than 30, less than 25, less than 20, less than 15, less than 10, or less than 5° C.

Furthermore, in various embodiments, this poly(vinyl acetal) layer or interlayer may exhibit enhanced acoustic properties, such as, for example, an improved tan delta as compared to a comparable poly(vinyl n-butyral) resin layer. Tan delta is the ratio of the loss modulus (G") in Pascals to the storage modulus (G') in Pascals of a specimen measured by Dynamic Mechanical Thermal Analysis (DMTA). The DMTA is performed with an oscillation frequency of 1 Hz under shear mode and a temperature sweep rate of 3° C/min.

The peak value of the G"/G' curve at the glass transition temperature is the tan delta value. Higher tan delta values are indicative of higher damping, which can translate to better sound dampening, or acoustic, performance.

The interlayers according to various embodiments of the present invention can be made by any suitable process known to one of ordinary skill in the art of producing interlayers and is not limited to a method for its manufacture. For example, it is contemplated that the layers or interlayers may be formed by extrusion or co-extrusion by inserting a probe into the die, as previously described. In an extrusion process, one or more thermoplastic resins, plasticizers, and, optionally, one or more additives as described previously, can be pre-mixed and fed into an extrusion device. The extrusion device is configured to impart a particular profile shape to the thermoplastic composition in order to create an extruded sheet. The extruded sheet, which is at an elevated temperature and highly viscous throughout, can then be cooled to form a polymeric sheet. Once the sheet has been cooled and set, it may be cut and rolled for subsequent storage, transportation, and/or use as an interlayer.

Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material. The extrusion process can occur at temperatures known to one skilled in the art depending on the materials and application.

Alternatively, each layer of the interlayer can be separately formed or extruded into sheets, and the sheet can be laid up to form a laminate structure of the desired order, and then pressed under heat and pressure to form the multilayer interlayer. In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device, wherein the layer or interlayer can be melted and extruded from a die to thereby provide an extruded sheet. Alternatively, one or more layers may be purchased or produced separately using known processes in the art.

As previously described, the gradient or color band is co-extruded with at least one other layer of polymer. In embodiments, the gradient band may be co-extruded in one outer layer of a multi-layer interlayer, such as a tri-layer interlayer as previously described.

Other additives may be incorporated into any one of the above-described layers used to form the laminates or interlayers in order to enhance the performance of the final product and impart certain additional properties to the interlayer. Such additives include, but are not limited to, ACAs, anti-blocking agents, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The additives, in liquid, powder, or pellet form, are often used and can be mixed into the thermoplastic resin or plasticizer prior to arriving in the extruder device or combined with the thermoplastic resin inside the extruder device. These additives are incorporated into the composition, and by extension the resultant interlayer, to enhance certain properties of the interlayer and its performance in a multiple layer glass panel product.

The interlayers can be used in many applications, such as in laminates or panels (such as windshields or other vehicle windows) comprising one or more rigid substrates. A panel made with the layers and interlayers described herein, such as a glass panel which comprises an interlayer laminated between two glass substrates, can have good optical clarity. The clarity of the interlayer laminated between glass substrates can be determined by measuring the haze value, which is a quantification of light not transmitted through the sheet glass panel containing the multilayer interlayer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments, such as windshields, the interlayers described herein can exhibit a haze of less than 10, less than 9, less than 8, less than 7, less than 6, less than 5, less than 4, less than 3, less than 2, less than 1.5, less than 1, less than 0.75, or less than 0.5 percent as measured according to ASTM D1003-61. In other embodiments, optical properties may not be as critical or where less clarity is desired, a higher haze level may be desirable or acceptable.

Another parameter used to determine the optical performance is percent transmittance (% Transmittance) or the transmittance spectrum. The transmittance spectrum was measured using a Thorlabs OSL1 Fiber Illuminator as the visible light source on an ILT 1700 Research Radiometer at every 0.5 second on the laminated glass sample moving from the dark plateau to the cut-off (as previously described and shown in FIG. 1) at 3.0 mm/sec on the sample stage. The values provided herein were obtained by analyzing a polymer sample which had been laminated between two sheets of clear glass, each having a thickness of 2.3 mm (commercially available from Pittsburgh Glass Works of Pennsylvania).

The interlayers according to embodiments of the present invention may be utilized in a multiple layer panel or laminate that comprises at least one rigid substrate. Any suitable rigid substrate may be used and, in some embodiments, may be selected from the group consisting of glass, polycarbonate, biaxially oriented PET, copolyesters, acrylic, and combinations thereof. When the rigid substrate includes a polymeric material, the polymeric material may or may not include a hard coat surface layer. In some embodiments, the multilayer panels or laminates include a pair of rigid substrates with the resin interlayer disposed therebetween.

In various embodiments, the interlayers of the present invention will most commonly be utilized in multiple layer panels comprising two substrates, typically a pair of glass substrates, with the interlayers disposed between the two substrates. An example of such a construct would be: glass/interlayer/glass, wherein the interlayer can comprise any of the interlayers described above. These examples of multiple layer panels are in no way meant to be limiting, as one of ordinary skill in the art would readily recognize that numerous constructs other than those described above could be made with the interlayers of the present invention.

The interlayers described herein can be laminated between glass using techniques known in the art. The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to an appropriate temperature, such as about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at an appropriate temperature and pressure, such as temperatures between 80 and 150° C. and pressures between 15 psig and 200 psig for about 30 to 90 minutes. Other means for use in de-airing of the interlayer-glass interfaces (steps 2 to 5) known in the art and that are commercially practiced include vacuum bag and vacuum ring processes in which a vacuum is utilized to remove the air. An alternate lamination process involves the use of a vacuum laminator that first de-airs the assembly and subsequently finishes the laminate at a sufficiently high temperature and vacuum.

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention. This invention can be further illustrated by the following examples of embodiments thereof, although it will be understood that these examples are included merely for the purposes of illustration and are not intended to limit the scope of the invention unless otherwise specifically indicated.

EXAMPLES

Example 1

Figure 2:
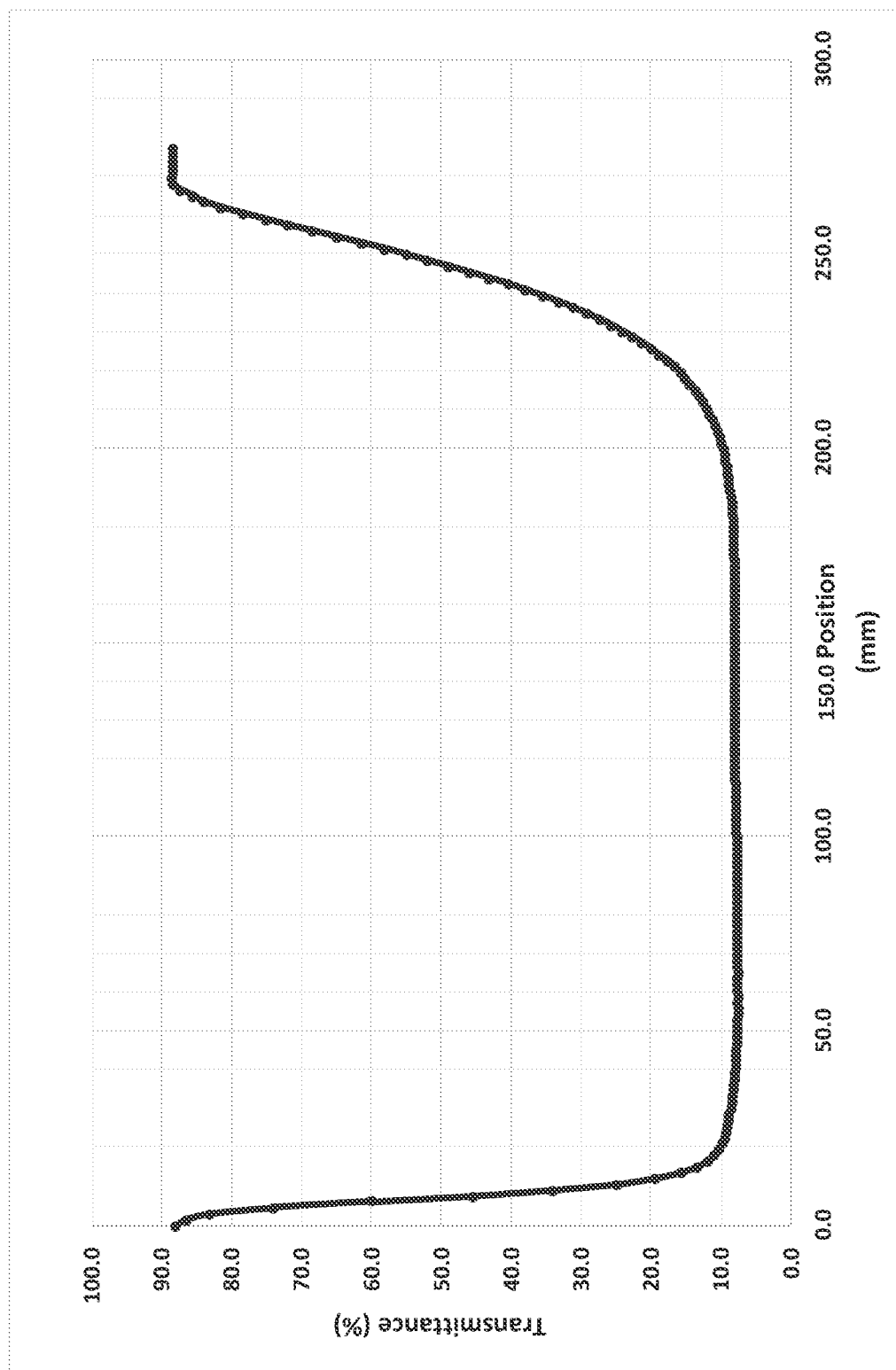
FIG. 2 is a graph showing the % transmission across the gradient band of Example 1.

Clear polyvinyl butyral melt was fed to the manifold through the feed pipe at a temperature of 204° C. and a flow rate through the extruder of 136 kg/hr. Colored polyvinyl butyral was side-fed to the probe at a temperature of 194° C. and a flow rate through the probe of 44 kg/hr. The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe. The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 2.

D and d were measured on the transmittance spectrum produced. Cross-sections of the sheet containing gradient band were examined on a Leica M165C optical microscope to check the colorant diffusion to the encapsulating or adjacent layer(s). Severity of the Mach band was subjectively determined and was categorized as either "Good" (or acceptable) or "Bad" (unacceptable), based on the Mach band appearance when the laminated glass sample was placed on top of the light box. Gradient beauty was rated subjectively and categorized as "A" (best), "B" (mediocre), or "C" (worst). The results are summarized in the Table 1 below.

Example 2

Figure 3:
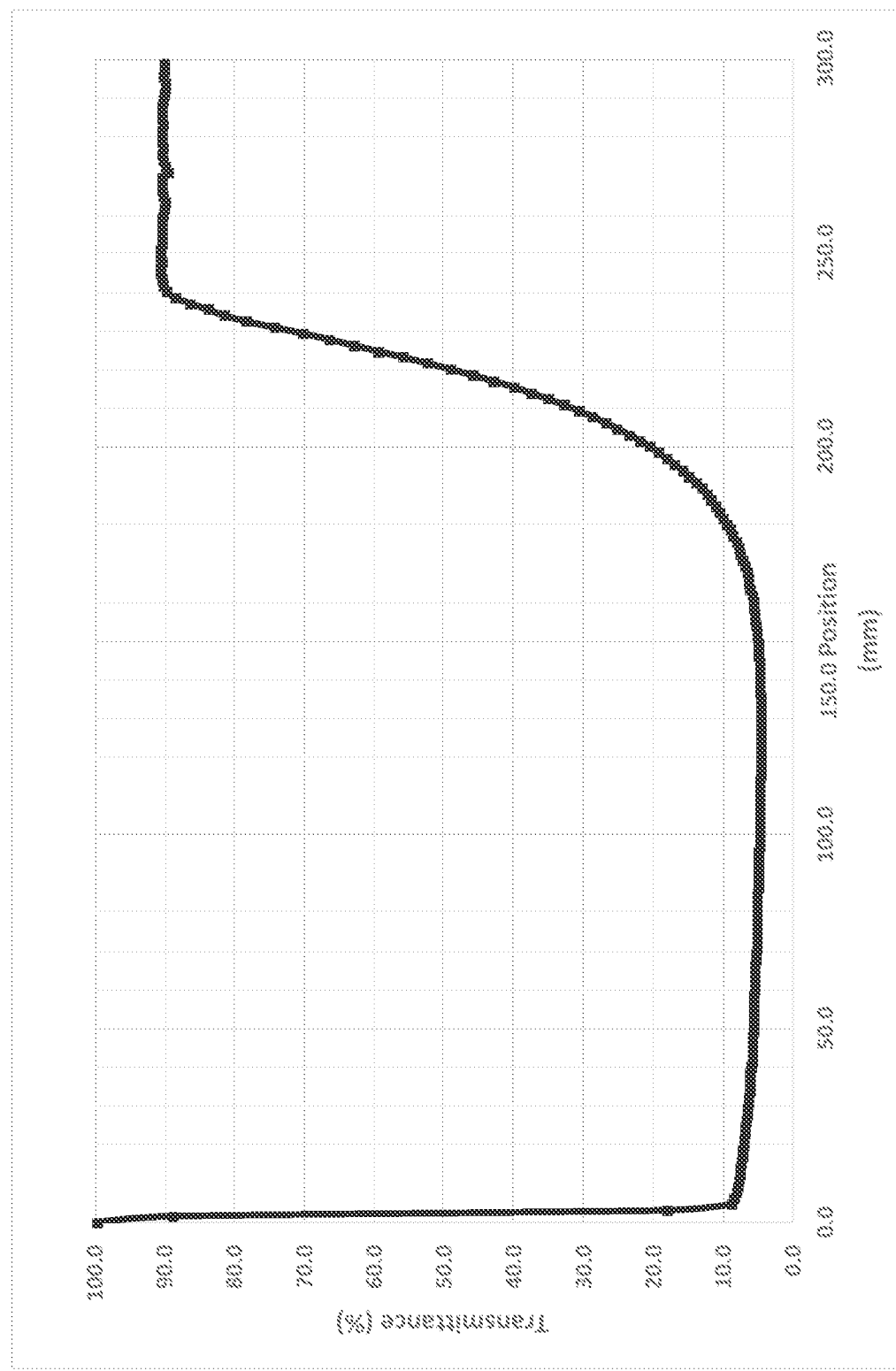
FIG. 3 is a graph showing the % transmission across the gradient band of Example 2.

Clear polyvinyl butyral melt was fed to the manifold through the feed pipe at a temperature of 204° C. and a flow rate through the extruder of 136 kg/hr. Colored polyvinyl butyral was side-fed to the probe at a temperature of 194° C. and a flow rate through the probe of 33 kg/hr. The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe. The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 3. D and d were measured on the transmittance spectrum and Mach band and gradient beauty were assessed as described in Example 1 and the results are summarized in the Table 1.

Comparative Example 1

Figure 4:
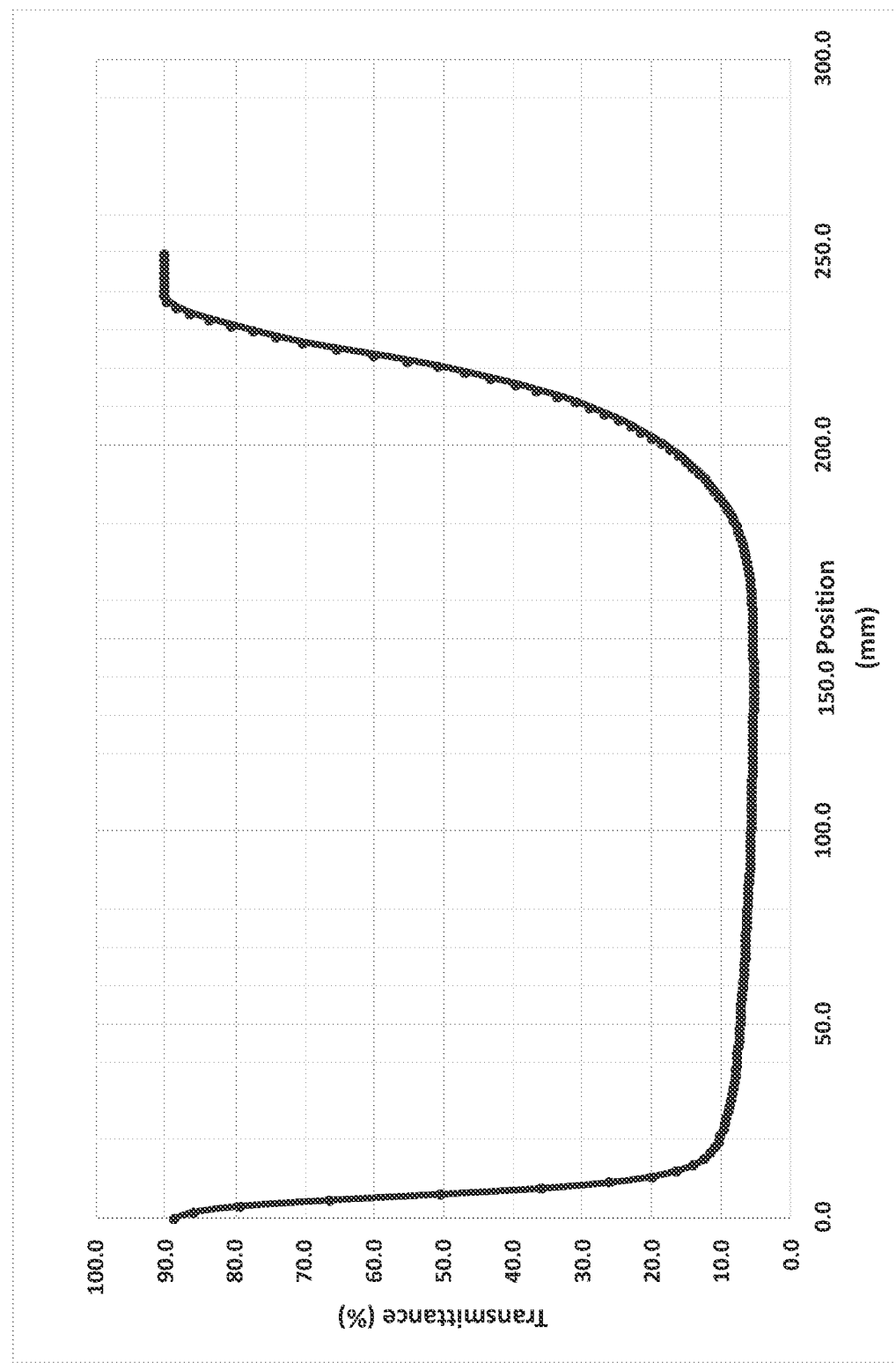
FIG. 4 is a graph showing the % transmission across the gradient band of Comparative Example 1.

Clear polyvinyl butyral melt was fed to the manifold through the feed pipe at a temperature of 204° C. and a flow rate through the extruder of 136 kg/hr. Colored polyvinyl butyral was side-fed to the probe at a temperature of 194° C. and a flow rate through the probe of 22 kg/hr. The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe. The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 4. D and d were measured on the transmittance spectrum and Mach band and gradient beauty were assessed as described in Example 1 and the results are summarized in the Table 1.

Comparative Example 2

Figure 5:
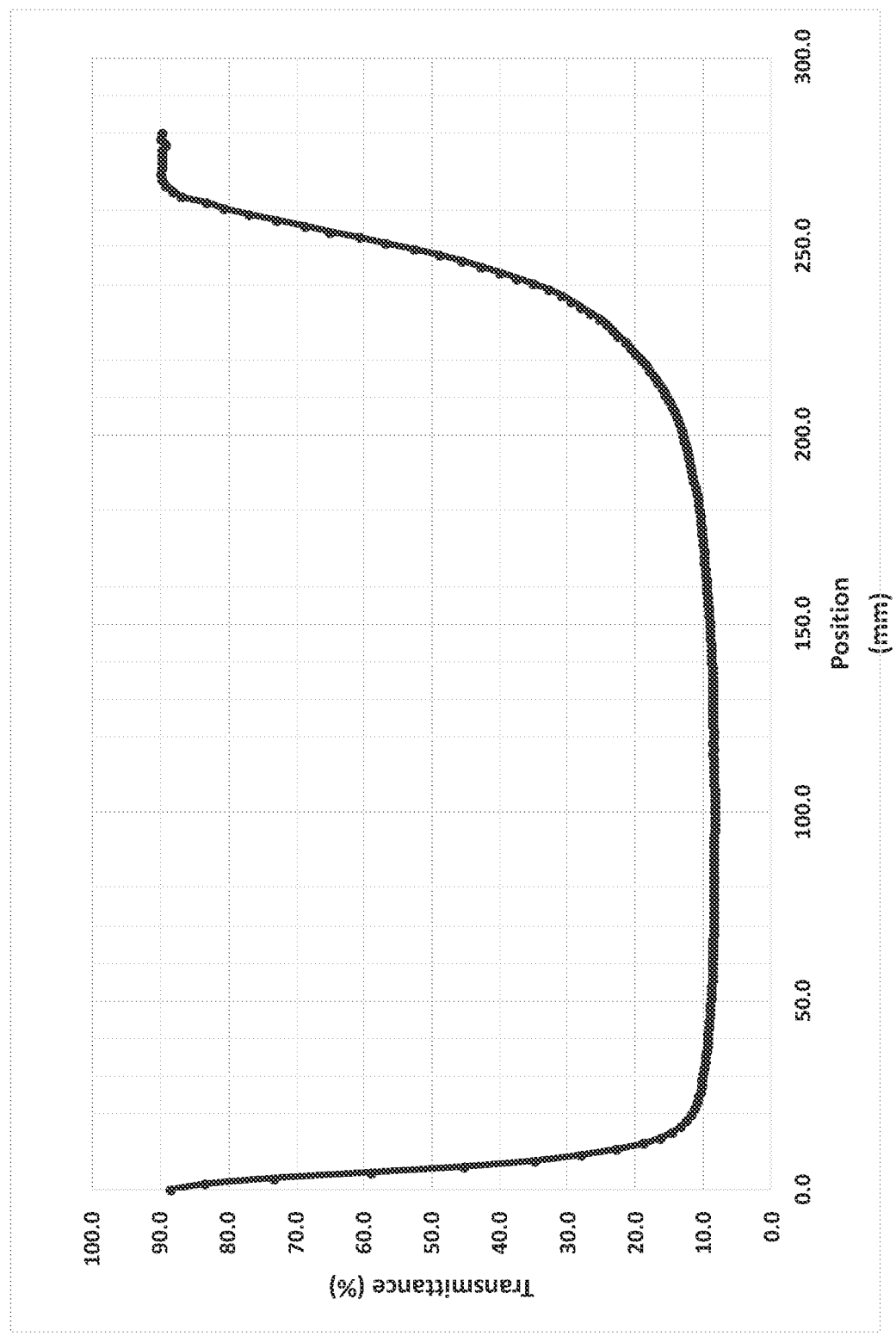
FIG. 5 is a graph showing the % transmission across the gradient band of Comparative Example 2.

Clear polyvinyl butyral melt was fed to the manifold through the feed pipe at a temperature of 204° C. and a flow rate through the extruder of 136 kg/hr. Colored polyvinyl butyral was side-fed to the probe at a temperature of 194° C. and a flow rate through the probe of 33 kg/hr. The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe. The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 5. D and d were measured on the transmittance spectrum as described in Example 1 and the results are summarized in the Table 1.

Comparative Example 3

Figure 6:
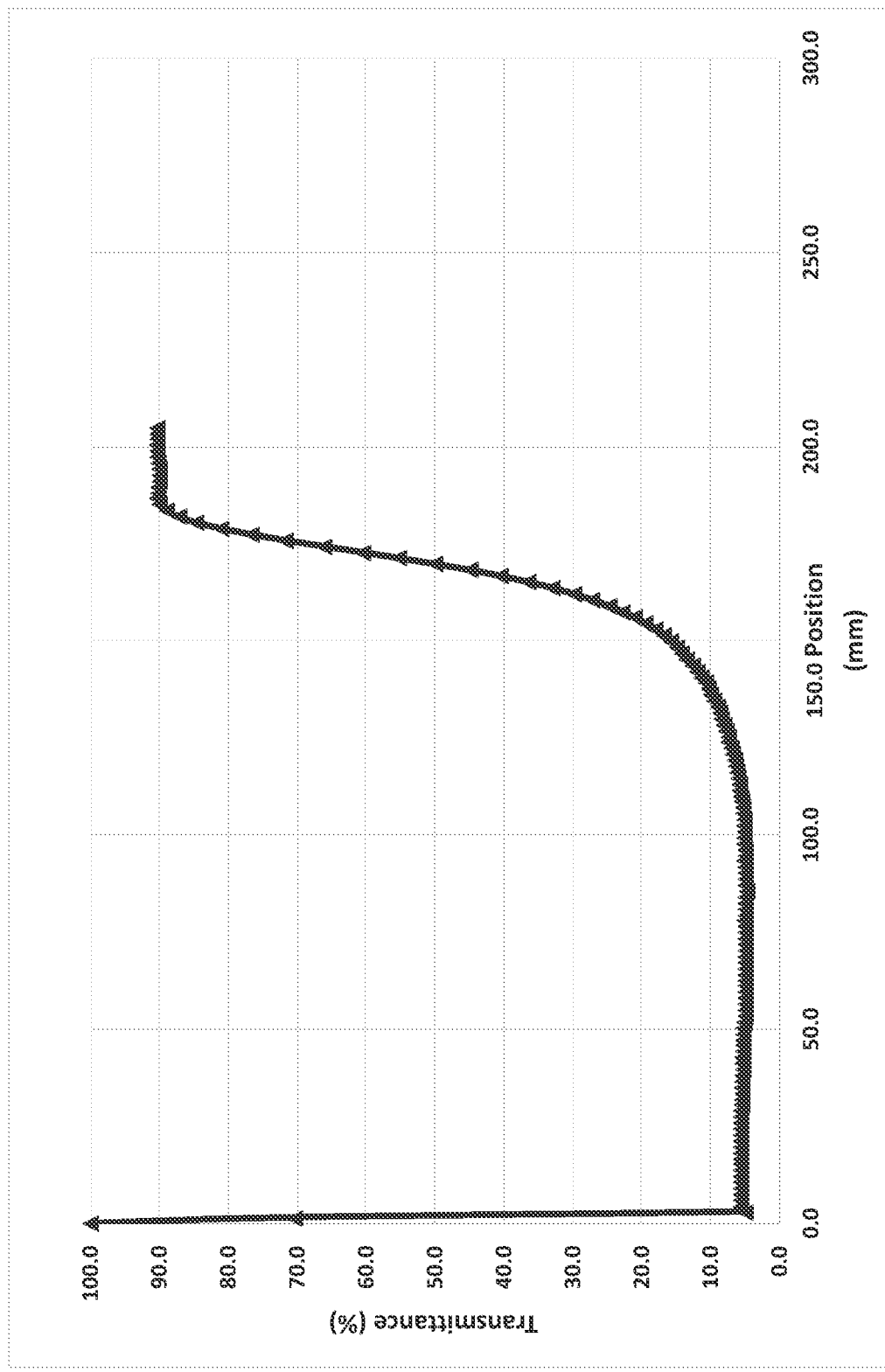
FIG. 6 is a graph showing the % transmission across the gradient band of Comparative Example 3.

Clear polyvinyl butyral melt was fed to the 3-layer die manifolds through the feed pipe at a temperature of 204° C. and a flow rate through the extruder of 136 kg/hr. Colored polyvinyl butyral containing 2% solvent was side-fed to the probe inserted in one of the skin layer manifolds at a temperature of 194° C. and a flow rate through the probe of 22 kg/hr. The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe. The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 6. D and d were measured on the transmittance spectrum as described in Example 1 and the results are summarized in the Table 1.

Comparative Example 4

Clear polyvinyl butyral melt was fed to the manifold through the feed pipe at a temperature of 204° C. and a flow rate through the extruder of 136 kg/hr. Colored polyvinyl butyral containing 2% solvent was side-fed to the probe at a temperature of 194° C. and a flow rate through the probe of 33 kg/hr.

The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe.

Figure 7:
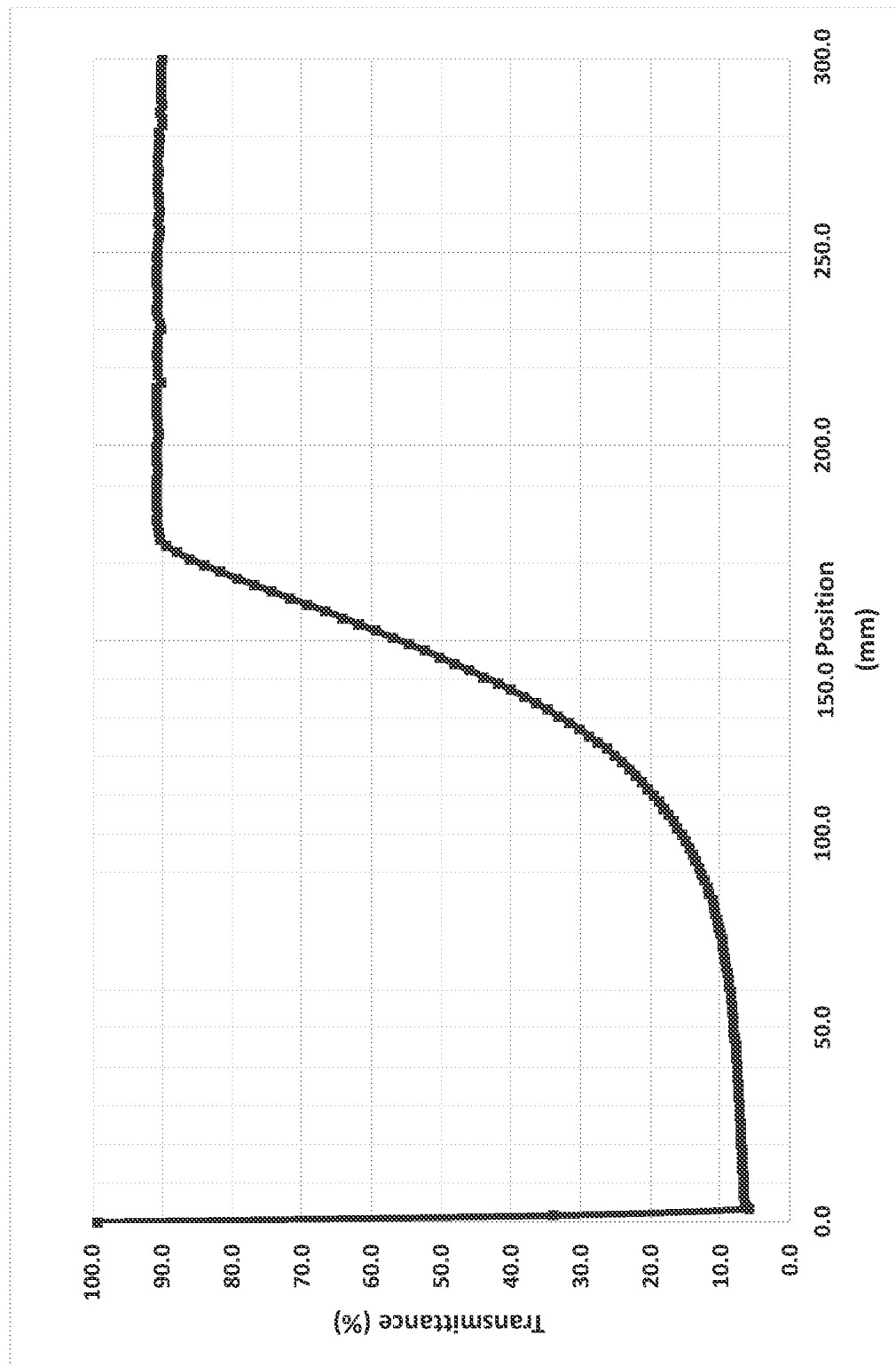
FIG. 7 is a graph showing the % transmission across the gradient band of Comparative Example 4.

The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 7. D and d were measured on the transmittance spectrum as described in Example 1 and the results are summarized in the Table 1.

Comparative Example 5

Figure 8:
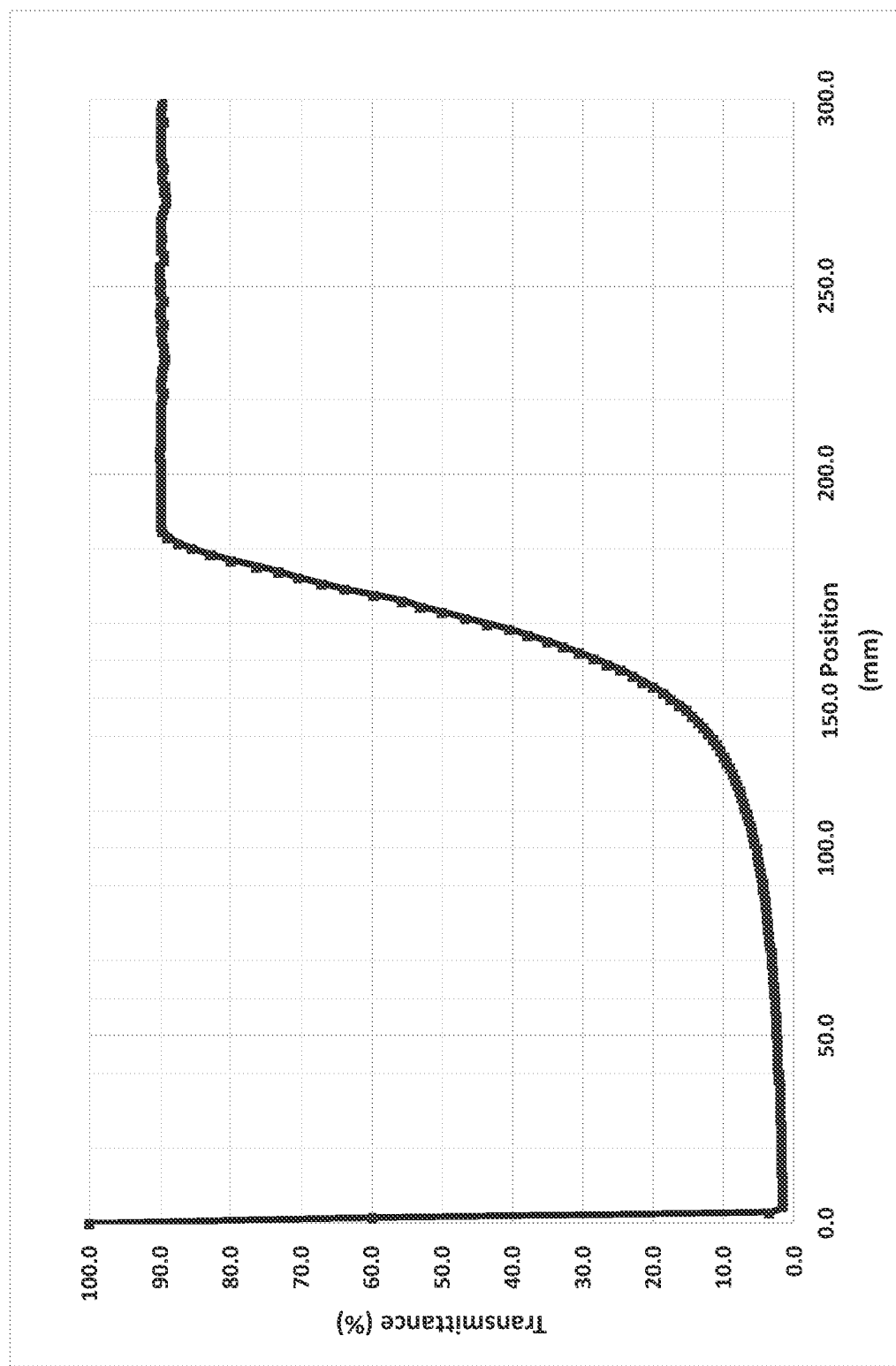
FIG. 8 is a graph showing the % transmission across the gradient band of Comparative Example 5.

Clear polyvinyl butyral melt was fed to the manifold through the feed pipe at a temperature of 204° C. and a flow rate through the extruder of 136 kg/hr. Colored polyvinyl butyral containing 2% solvent was side-fed to the probe at a temperature of 194° C. and a flow rate through the probe of 22 kg/hr. The orifice gap profile in the probe was adjusted to generate the target transmittance spectrum measured on the laminated glass containing the sheet. A sheet having thickness of 0.76 mm was obtained with an encapsulated gradient band having excellent uniformity of appearance along the sheet and a width that closely approximated the width of the extrusion orifice in the probe. The sheet was laminated by placing in between a pair of 2.2 mm thick clear glass sheets, applying heat and pressure on a Carver press at 2 bar and at 150° C. for 1 minute, and then autoclaving the pressed sample at 13 bar and at 143° C. for one hour. After lamination, the transmittance spectrum was measured using a Thorlabs OSL1 Fiber Illuminator as the visible light source on an ILT 1700 Research Radiometer at every 0.5 second on the laminated glass sample moving from dark plateau to cut-off at 3.0 mm/sec on the sample stage. The resulting visible light transmittance spectrum is shown in FIG. 8. D and d were measured on the transmittance spectrum as described in Example 1 and the results are summarized in the Table 1.

The gradient bands were visually inspected to determine whether the colorants diffused into adjacent layers, for the severity of the Mach band (that is, whether it is objectionable or not), and for a rating of the gradient beauty. The gradient bands were also measured to determine D and d, as described previously.

Gradient beauty is a subjective rating given by an expert on a test sample against a pre-manufactured reference specimen. A rating of "A" means that the sample had a smooth fade-off of the gradient band with no sharp cut-off. A "C" rating "C" means that the sample had either a stiff gradient fade-off or a sharp cut-off (or possibly both). A "B" rating is a rating that is between an "A" rating and a "C" rating visually. The severity of the Mach band has been characterized subjectively as either "Good" or "Bad". A "Good" quality Mach band that the sample had a weak, wide and diffused Mach band, while a sample having a sharp and bright (or more visible) Mach band would be given a "Bad" rating.

Table 1 below shows the results obtained for the Examples and Comparative Examples.

TABLE 1

| Example | D (mm) | d (mm) | D/d | Colorant Diffusion | Severity of Mach Band | Gradient Beauty Rating |
|---|---|---|---|---|---|---|
| Example 1 | 25.8 | 15.2 | 1.70 | N | Good | A |
| Example 2 | 26.2 | 13.2 | 1.89 | N | Good | A |
| Comparative Example 1 | 23.0 | 10.7 | 2.14 | N | Good | B |
| Comparative Example 2 | 26.2 | 12.3 | 2.13 | N | Good | B |
| Comparative Example 3 | 16.8 | 9.2 | 1.83 | Y | Bad | C |
| Comparative Example 4 | 38.9 | 22.0 | 1.77 | Y | Bad | C |
| Comparative Example 5 | 27.7 | 13.9 | 2.00 | Y | Bad | C |

The above shows that interlayers having gradient bands that have good visual quality when looking at the Mach band and gradient beauty (as previously described) can be produced when the D and d variables are controlled to certain numbers, and D/d is controlled within a specified range.

When outside of the specified ranges, the gradient beauty suffers. Examples 1 and 2 both have good visual quality (Mach bands are good and gradient beauty ratings of "A") and have D values between 22.9 and 38.1, D/d values are below 2.00 and there is no diffusion of the colorant or colored layer to adjacent layers. The Comparative Examples all have at least one property outside the desired ranges. Comparative Examples 1 and 2 both have a D value within the preferred range, but d is low and therefore D/d is greater than 2, resulting in a gradient beauty rating of "B". Comparative Example 2 has a low D value, although D/d is within the desired range, resulting in a gradient beauty rating of "B" also. Comparative Example 3 has a D value that is also low, but D/d is within the desired range, but there is colorant diffusion into adjacent layers, resulting in a gradient beauty rating of "C". Comparative Example 4 has a D value that is high, but D/d is within the desired range, but there is colorant diffusion into adjacent layers, resulting in a gradient beauty rating of "C". Comparative Example 5 has a D value that is acceptable, but D/d is right at 2.00 and there is colorant diffusion into adjacent layers, resulting in a gradient beauty rating of "C".

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject. As used herein, the terms "having," "has," and "have" have the same open-ended meaning as "comprising," "comprises," and "comprise" provided above. As used herein, the terms "including," "include," and "included" have the same open-ended meaning as "comprising," "comprises," and "comprise" provided above.

As used herein, the term "about" refers to values within ten percent of the recited value. The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The invention claimed is:

1. An interlayer having improved gradient quality, comprising:
    a first layer having a clear portion and a gradient color band portion, and wherein the gradient color band portion is encapsulated within the clear portion,
    wherein the gradient color band portion has a cut-off X at the start of the gradient color band, a point Y where the % transmittance of the gradient color band is 40%, a point Z where the % transmittance of the gradient color band is 70%, a distance D that is the distance from X to Y and a distance d that is the distance from Y to Z,
    and wherein the distance D in the gradient portion meets the following equations: 22.9 mm<D<38.1 mm and D/d<2.00.

2. The interlayer of claim 1, wherein the distance D in the gradient portion meets the following equation: 25.4 mm<D<30.5 mm.

3. The interlayer of claim 1, wherein D/d<1.95.

4. The interlayer of claim 1, wherein D/d<1.9.

5. The interlayer of claim 1, wherein D/d>1.50.

6. The interlayer of claim 1, wherein D/d 1.70.

7. The interlayer of claim 1, wherein D/d<1.95 and 25.4 mm<D<30.5 mm.

8. A process for making an interlayer having improved gradient quality, the process comprising the steps of:
    (a) providing a sheet extrusion die having an orifice and a manifold adapted to feed a polymer melt to the orifice by way of an extrusion passage;
    (b) providing a probe located within the manifold and adjacent the extrusion passage wherein the probe has in the surface adjacent the extrusion passage an extrusion orifice that extends parallel to the probe axis and wherein the probe is located in such a position that, when a main flow of a thermoplastic polymer is fed into the manifold and extruded through the slit die by way of the extrusion passage, the stream lines of the main flow as it passes by the probe orifice are substantially parallel and in the direction of extrusion;
    (c) feeding a main flow of molten thermoplastic polymer to the manifold and a colored secondary flow of the molten thermoplastic polymer, at substantially the same temperature and viscosity, to the probe;
    (d) extruding both flows simultaneously such that a layer of colored polymer that is constant in width but tapering in thickness at one extremity of its width, is completely encapsulated in the main flow of molten polymer; and
    (e) extruding the combined flows through the slit die to produce a sheet with an encapsulated gradient color band portion, wherein the gradient color band portion has a cut-off X at the start of the gradient color band, a point Y where the % transmittance of the gradient color band is 40%, a point Z where the % transmittance of the gradient color band is 70%, a distance D that is the distance from X to Y and a distance d that is the distance from Y to Z, and wherein the distance D in the gradient portion meets the following equations: 22.9 mm<D<38.1 mm and D/d<2.00.

9. The process of claim 8, wherein the distance D in the gradient portion meets the following equation: 25.4 mm<D<30.5 mm.

10. The process of claim 8, wherein D/d <1.95.

11. The process of claim 8, wherein D/d >1.50.

12. The process of claim 8, wherein D/d 1.70.

13. The process of claim 8, wherein D/d<1.95 and 25.4 mm<D<30.5 mm.

14. An interlayer produced by the process of claim 8.

15. A windshield comprising:
a first glass substrate, the interlayer of claim 1, and a second glass substrate.

16. A windshield comprising:
a first glass substrate, the interlayer of claim 14, and a second glass substrate.

17. A windshield comprising:
a first glass substrate,
a second glass substrate, and
an interlayer having improved gradient quality, comprising:
a first layer having a clear portion and a gradient color band portion, and wherein the gradient color band portion is encapsulated within the clear portion,
wherein the gradient color band portion has a cut-off X at the start of the gradient color band, a point Y where the % transmittance of the gradient color band is 40%, a point Z where the % transmittance of the gradient color band is 70%, a distance D that is the distance from X to Y and a distance d that is the distance from Y to Z, and wherein the distance D in the gradient portion meets the following equations: 22.9 mm<D<38.1 mm and D/d<2.00,
wherein the interlayer is between the first glass substrate and the second glass substrate.

18. The windshield of claim 17, wherein the interlayer has the distance D in the gradient portion meets the following equation: 25.4 mm <D<30.5 mm.

19. The windshield of claim 17, wherein the interlayer has D/d<1.95.

20. The windshield of claim 17, wherein the interlayer has D/d<1.95 and 25.4 mm<D<30.5 mm.

* * * * *